United States Patent [19]

Wareham

[11] Patent Number: 4,829,827
[45] Date of Patent: * May 16, 1989

[54] PRESSURE TRANSDUCER

[75] Inventor: William Wareham, Marion, Mass.

[73] Assignee: Dynisco, Inc., Norwood, Mass.

[*] Notice: The portion of the term of this patent subsequent to Jul. 14, 2004 has been disclaimed.

[21] Appl. No.: 54,936

[22] Filed: May 27, 1987

Related U.S. Application Data

[63] Continuation-in-part of Ser. No. 792,169, Nov. 14, 1985, Pat. No. 4,679,438, which is a continuation-in-part of Ser. No. 689,385, Jan. 7, 1985, Pat. No. 4,680,972.

[51] Int. Cl.$^4$ .............................. G01L 7/08; G01L 9/04
[52] U.S. Cl. ........................................ 73/726; 73/706; 338/4
[58] Field of Search ................. 73/726, 727, 730, 706, 73/721, 770, 708; 338/4, 42; 29/517, 454, 157 R

[56] References Cited

U.S. PATENT DOCUMENTS

| | | | |
|---|---|---|---|
| 3,349,623 | 10/1967 | Pastan | 73/726 |
| 3,678,753 | 7/1972 | Eggleston | 338/4 |
| 4,369,659 | 1/1983 | Wareham | 73/708 |
| 4,679,438 | 7/1987 | Wareham | 73/726 |
| 4,680,972 | 7/1987 | Wareham | 73/730 |
| 4,702,113 | 10/1987 | Wareham | 73/706 |
| 4,712,430 | 12/1987 | Wareham | 73/706 |

FOREIGN PATENT DOCUMENTS

| | | |
|---|---|---|
| 2211609 | 3/1972 | Fed. Rep. of Germany. |
| 1110137 | 4/1968 | United Kingdom. |

Primary Examiner—Donald O. Woodiel
Attorney, Agent, or Firm—Wolf, Greenfield & Sacks

[57] ABSTRACT

A pressure transducer for the measurement of mid-range pressures in the preferred range of 500-7500 psi and including an elongated frame having a capillary tube extending therethrough and employing a coupler at one end of the frame for sensing input pressure. A sensing member is provided at the other end of the capillary tube and has a sensing chamber adapted to have at least one filler means disposed therein. A recess is provided in the sensing member defining a relatively thin wall adjacent the sensing chamber. This wall has a pressure responsive sensing surface that extends substantially parallel to the capillary tube length and upon which strain gages are secured.

41 Claims, 6 Drawing Sheets

PRESSURE TRANSDUCER

RELATED APPLICATIONS

This is a continuation-in-part of application Ser. No. 798,169 filed Nov. 14, 1985, now U.S. Pat. No. 4,679,438 which in turn is a continuation-in-part of application Ser. No. 689,385 filed Jan. 7, 1985 now U.S. Pat. No. 4,680,972.

BACKGROUND OF THE INVENTION

1. Field of the Invention

The present invention relates in general to pressure transducers and is concerned, more particularly, with a new and improved fluid-filled, direct-sensing pressure transducer. Even more particularly, the present invention relates to a pressure transducer adapted for midpressure range measurements. Although the invention is not limited thereto, the transducer described herein is in particular adapted for use at pressure ranges on the order of 500–7500 psi.

2. Prior Art Discussion

The following is a list of prior art patents that in general relate to pressure transducers: U.S. Pat. Nos. 3,349,623, 4,369,659, 3,678,753, 3,349,623, 2,940,313, 2,627,749, 2,326,047, 3,336,555, 2,738,677. Some of these patents are owned by the assignee herein and show fluid filled pressure transducers.

U.S. Pat. Nos. 2,949,313 and 2,627,749 both illustrate pressure indicators that employ strain tubes or the like for transmitting pressure to a diaphragm on which pressure is sensed by strain gages.

U.S. Pat. Nos. 3,326,047 and 3,336,555 illustrate pressure transducers. U.S. Pat. No. 3,336,555 illustrates an unfilled pressure transducer with strain gage sensing. U.S. Pat. No. 3,326,047 on the other hand illustrates a fluid filled pressure transducer employing a pressure sensing capsule having inner and outer deformable cylindrical walls. The liquid-filling in a transducer of this type has a relatively large volume and thus creates limitations upon the range of pressure measurements.

U.S. Pat. No. 2,738,677 is actually directed to a pressure indicator particularly for combustion chambers such as in an internal combustion engine.

Liquid-filled pressure transducers owned by the assignee herein include U.S. Pat. Nos. 3,349,623; 3,678,753; and 4,369,659. The early U.S. Pat. No. 3,349,623 describes a device employing an annular sensing chamber with associated strain gages. U.S. Pat. No. 3,678,753 is believed to be an improved form of the earlier version employing a top cap member and associated disc-shaped compartment defined between the cap member and the body of the instrument. The transducer illustrated in U.S. Pat. No. 3,678,753 provided an increased operating pressure range. U.S. Pat. No. 4,369,659 describes a melt pressure transducer preferably for use in pressure measurements associated with an injection molding machine and employing a novel temperature compensating filler rod.

Another prior art patent is U.S. Pat. No. 3,128,628 to Lebow. This patent illustrates a pressure transducer but does not employ any capillary tube.

OBJECTS OF THE INVENTION

One object of the present invention is to provide a liquid-filled pressure transducer operating at mid-range pressures.

Another object of the present invention is to provide an improved pressure transducer that is fluid-filled and that employs a reduced volume of fluid. This reduced volume of fluid provides for minimization of temperature effects upon pressure and furthermore makes for improved diaphragm constructions.

Accordingly, a further object of the present invention is to provide an improved liquid-filled pressure transducer in which diaphragm stresses are reduced.

Still another object of the present invention is to provide an improved fluid-filled pressure transducer that provides for reduced snout diaphragm stresses during applied pressure and upon exposure to elevated temperature.

Still another object of the present invention is to provide an improved fluid-filled pressure transducer provided with a snout piece of a different material, provided for the purpose of temperature compensation and for improving overall performance. The spout piece permits the liquid-filled void to expand at the same rate as the liquid itself during temperature changes.

A further object of the present invention is to provide an improved method of construction of a liquid-filled pressure transducer, particularly an improved technique for interconnecting the sensing element and capillary tube of the pressure transducer.

SUMMARY OF THE INVENTION

To accomplish the foregoing and other objects features and advantages of the invention there is provided a pressure transducer which comprises an elongated frame having an elongated passage therethrough and a capillary tube extending through the frame passage and terminating at one end adjacent to one end of the frame. A coupler closes that one end of the frame and defines with the frame a chamber in communication with the capillary tube. A sensing member in accordance with the invention is disposed about the capillary tube at the other end of the frame and includes means defining a sensing chamber in fluid communication with the capillary tube. The sensing chamber is formed by multiple interconnected passages each accommodating a filler rod. The sensing member may also include means defining a recess therein forming a relatively thin diaphragm with the multiple passage sensing chamber. This wall has a pressure responsive sensing surface that extends substantially parallel to the filler rod length. The sensing of pressure may be accomplished by means of a strain gage arrangement disposed on the pressure responsive sensing surface. The strain gage sensing means may be connected in a bridge arrangement. In accordance with one feature of the invention there is preferably also provided in the transducer at the diaphragm end thereof a snout piece of a different material than that of the frame of the transducer having a relatively low coefficient of expansion for providing temperature compensation.

Numerous other embodiments of the invention are also described herein. In one embodiment, the multiple interconnected passages and multiple filler rods may be replaced by a single extended passage and associated single filler piece. In another embodiment of the invention, one or more of the filler rods may be replaced by the capillary tube itself extending into the sensing chamber. In still another embodiment of the invention, the capillary tube itself may extend through the sensing chamber and may be used in association with one or more adjacently disposed filler rods. In alternate embodiments of the invention, the capillary tube and fill tube may be disposed at either the same end of the sensing chamber or opposite ends thereof. In still a further embodiment of the present invention, the sensing chamber may be disposed adjacent the outer circumference of the sensing element with the strain gages being provided on the outer surface thereof or on a flat surface thereof.

BRIEF DESCRIPTION OF THE DRAWINGS

Numerous other objects, features and advantages of the invention should now become apparent upon a reading of the following detailed description taken in conjunction with the accompanying drawing, in which:

5A is a cross-sectional view similar to that of FIG. 5 but illustrating an alternate embodiment in which the filler member is of single-piece construction;

14 is a partially cut-away longitudinal view of still a further embodiment of the sensing member of the present invention in which the sensing chamber is disposed adjacent the outer surface of the sensing member;

FIG. 15 is a cross-sectional view taken along line 15—15 of FIG. 14; and

FIG. 16 is a cross-sectional view similar to that illustrated in FIG. 15, but with the sensing member body having a flat on the outer surface thereof.

DETAILED DESCRIPTION

Reference is now made to FIGS. 1–5 for the details of one embodiment of a pressure transducer constructed in accordance with the principles of the present invention. FIG. 5A shows an alternate embodiment of the invention. FIG. 5B shows the schematic diagram of the strain gage interconnections. The additional cross-sectional views in FIGS. 6–16 illustrate further alternate embodiments of the invention to be described in detail hereinafter.

With reference to FIGS. 1–5, the pressure transducer includes a main frame 10, a sensing member 12 provided at the top of the frame 10, a capillary tube 14 which extends through the frame, and a diaphragm coupler 16 secured to and enclosing the bottom end of the frame.

Figures 1, 1A, 2, 2A:
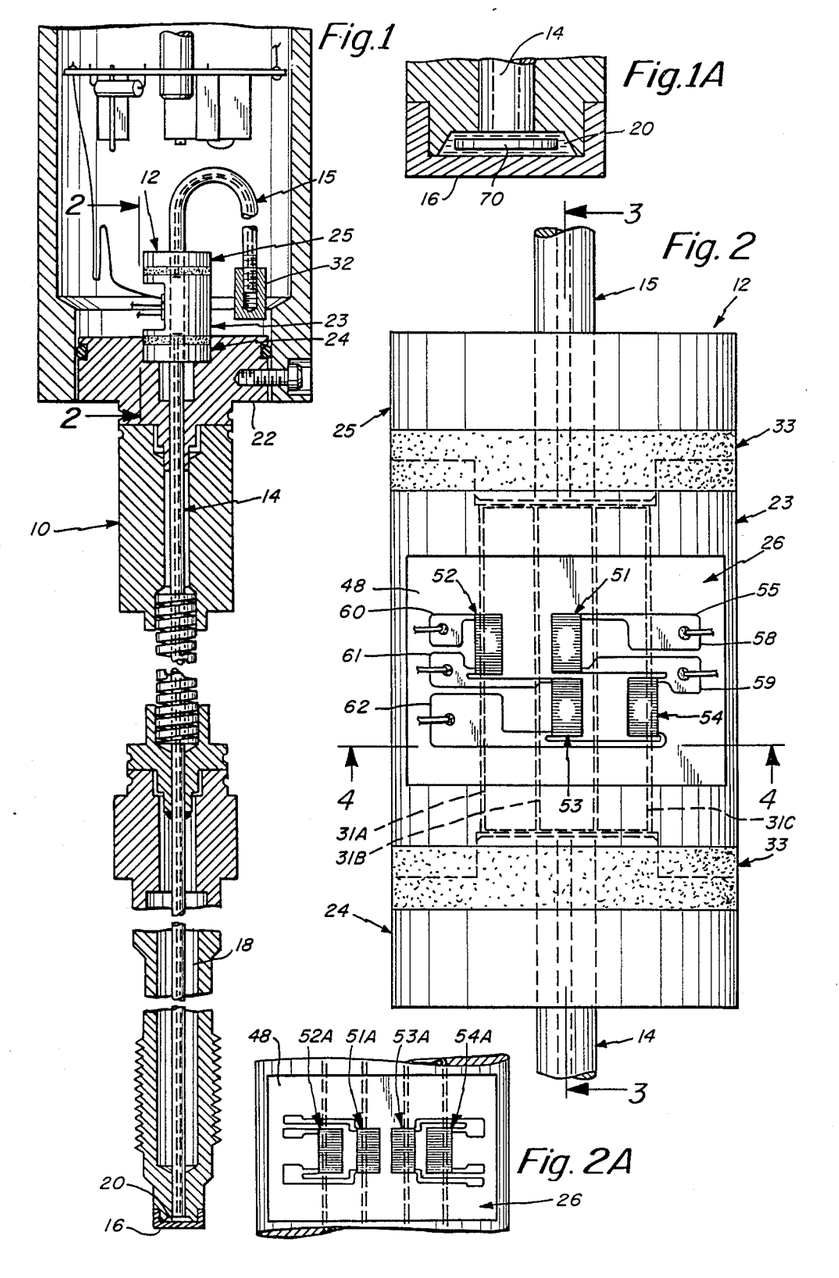
FIG. 1 is a cross-sectional side elevation view of a preferred embodiment of the fluid filled pressure transducer constructed in accordance with the principles of the present invention.
FIG. 1A is an enlarged cross-sectional view of a portion of a pressure transducer constructed in accordance with the invention and illustrating the further use of a snout filler piece.
FIG. 2 is a cross-sectional view taken along line 2—2 of FIG. 1 showing further details of the sensing member.
FIG. 2A is a fragmentary view similar to that illustrated in FIG. 2 but showing an alternate placement of the strain gages which is an in-line positioning.

The lower section of the frame 10 is constructed in a similar manner to the construction illustrated in U.S. Pat. No. 3,678,753. Basically there is an elongated passage 18 that extends through the main frame and which is for accommodating the capillary tube 14. The capillary tube 14 at its bottom end terminates at a relatively small chamber 20 which is closed by the diaphragm 16.

At the top end of the frame 10 there is included as part of the frame a top piece 22 through which the capillary tube 14 extends. The top piece 22 is for supporting the sensing member 12 in the position illustrated in the drawing. The sensing member 12 may be secured in position within the top piece 22 by being welded to the top piece.

Before consideration is given to the details of the sensing member 12, reference is now made to FIG. 1A. FIG. 1A shows an enlarged fragmentary view illustrating a preferred embodiment for the snout end of the device showing the snout filler piece 70 which is primarily used for temperature compensation reasons. This piece may be constructed of Kovar or Invar. Alternatively, this may be constructed of any very low coefficient of expansion material. It is preferred that it have a coefficient of expansion much less than that of the stainless steel frame. This fill piece 70 allows the void in chamber 20 to expand at the same rate as the liquid during temperature changes. The filler piece 70 illustrated in FIG. 6, functions to reduce internal fill pressure as the tip is heated with no applied pressure.

In connection with the liquid fill used in the device of the present invention, at least two different liquid fills may be employed. One typical liquid fill is mercury and the other may be, for example, sodium potassium (NaK). The NaK filled transducer is generally a lower pressure range transducer while the mercury transducer is usually used at higher relative pressures. Either of these fills may be used at the pressure ranges employed in accordance with the present invention.

Thus, the filler piece, in combination with the chamber 20 illustrated in FIG. 1A, provides a thermally compensated internal volume which is desired. Also, the filler piece as indicated previously is selected to have thermal properties that temperature compensate the transducer for differential thermal expansion coefficients between the internal fluid which is preferably mercury and the main body of the transducer which is usually stainless steel. As indicated previously, it is preferred to have a low temperature coefficient of expansion particularly in comparison with that of the frame material.

One of the advantages that has been realized with the improved sensing technique of the present invention is the capability of now being able to increase the thickness of the diaphragm 16 while reducing the stresses thereof. It has also been possible in accordance with this construction to minimize overall thermal characteristics. Reducing fill displacement under pressure reduces the diaphragm deflection and the resulting stresses allows the diaphragm to be increased in thickness within certain limitations to improve in situ durability.

In connection with the above, the maximum diaphragm thickness is related to two independent effects including internal fluid displacement under applied pressure and secondly internal pressure generated by thermal expansion of the contained fluid fill. In accordance with the invention, the sensor's small internal volume reduces the amount of fill and its resulting compression. Moreover, the sensor's low displacement or deflection under pressure further reduces total fluid displacement and resulting stresses. Moreover, the filler piece is adapted to control thermally induced internal pressure that also further reduces stresses. The combined improvements outlined above allow diaphragm thickness to be increased without increasing stresses and controls internal pressure effects versus temperature. The snout filler piece 70 is used in essence to replace some of the stainless steel at the tip of the instrument with a low temperature coefficient of expansion material thus temperature compensating the void 20. This preferred material as indicated previously, is Kovar or Invar.

With regard to the reduction in volume, it is noted that the internal volume of the sensing member 12 is very small because of the use of filler rods herein as to be described in association with the further description of the sensing member in FIGS. 2-5. The total volume within the entire transducer including the capillary tube may be in a range from $1.0 \times 10^{-3}$ to $2.0 \times 10^{-3}$ cubic inch. This very small volume compares with a transducer volume on the order of $3.2 \times 10^{-3}$ cubic inch for a transducer which is of the type described in U.S. Pat. No. 3,678,753. It can be readily seen that there is an improvement in the reduction of volume fill by at least 2 to 1 between the volumes of the transducer in the prior art and that in the present construction. With regard to the capillary tube, the inner diameter thereof can range from 0.005 to 0.010", and the outer diameter thereof can range from 0.060" to 0.25".

With regard to the filling of the transducer, this is accomplished at the filler tube 15. In FIG. 1 the filler tube is shown capped off but before this occurs the capillary tube and the rest of the voids communicating therewith in the device are filled with say mercury under vacuum and forced pressure after filling so that all of the void areas are filled with the mercury. The filler tube is then sealed off to retain the mercury in the transducer.

With reference to the construction of a sensing member 12, reference is now made to FIGS. 2-6. The sensing member 12 includes a main body 23 and associated end members 24 and 25. The main body 23 is provided with a recess 26 for receiving the strain gages on a surface 48 thereof as will be described in more detail hereinafter.

Within the main body 23, there are provided coextensive passages 30A, 30B and 30C. Each of these passages receive respective filler rods 31A, 31B and 31C. Each of the passages and associated filler rods extend longitudinally with each filler rod fitting with closing tolerance spacing within its accommodating passage. Close tolerance fits are employed so that the volume filler liquid is minimized. Typically the difference in diameters between the passage and filler rod may be on the order of 0.0025".

Figures 3, 4:
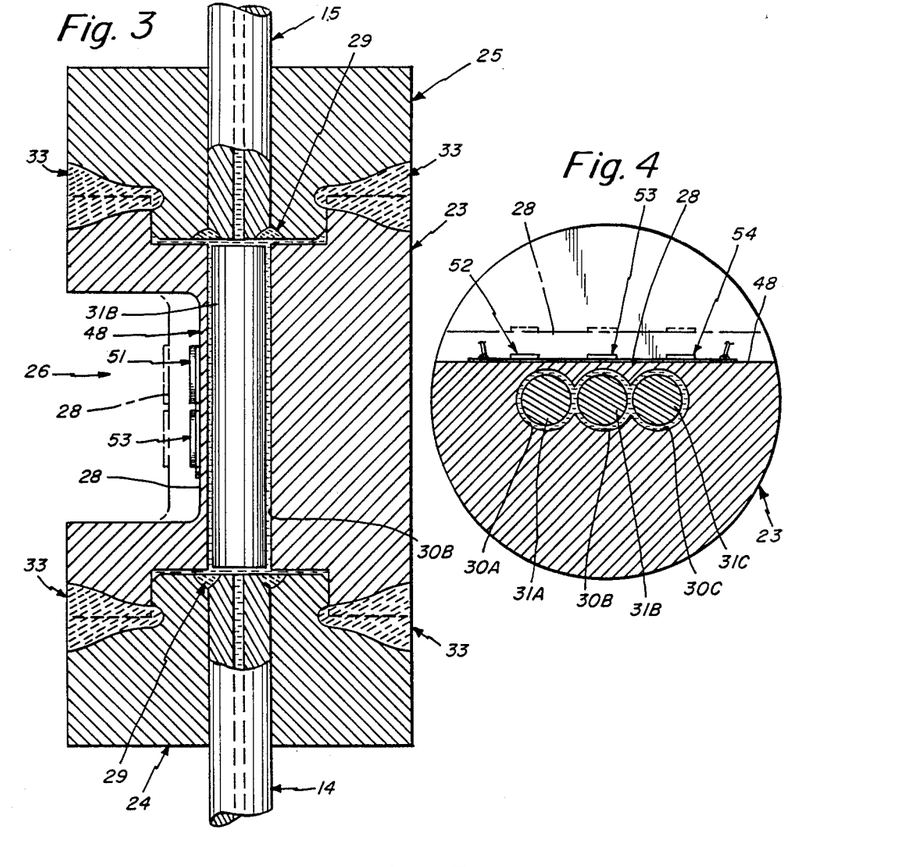
FIG. 3 is a cross-sectional view taken along line 3—3 of FIG. 2 showing further details.
FIG. 4 is a cross-sectional view taken along line 4—4 of FIG. 2 showing still further details of the sensing member.
Figure 5:
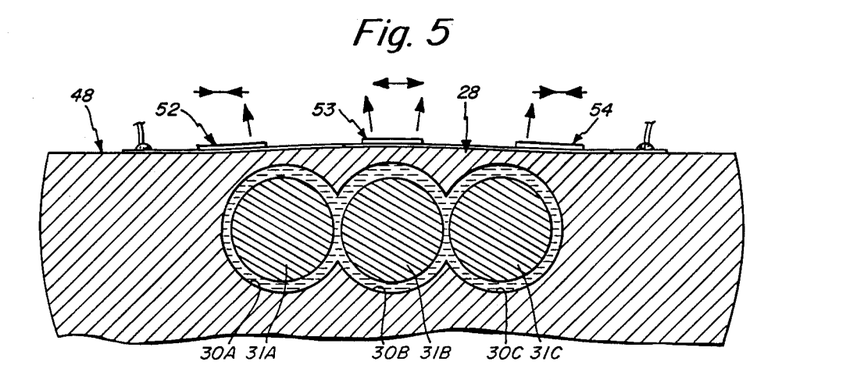
FIG. 5 is an enlarged cross-sectional view relating to FIG. 4 and illustrating the diaphragm under pressure.
Figure 5A:
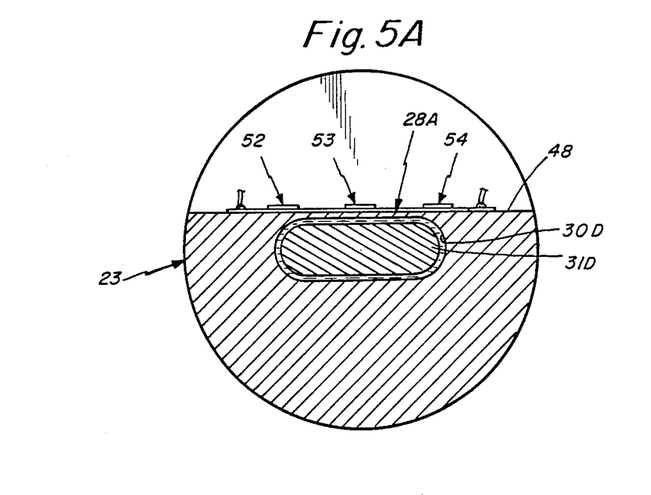
Figure 5B:
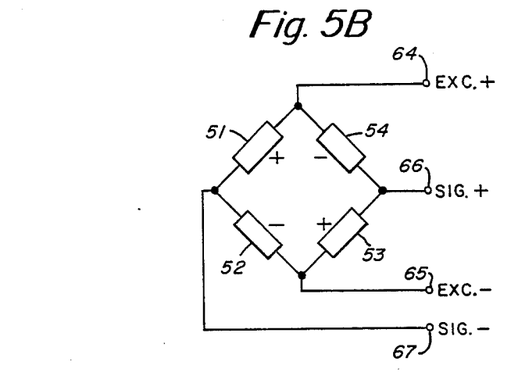
FIG. 5B is a schematic diagram illustrating the strain gage circuit employed in connection with the pressure transducer of the invention.

As illustrated in, for example, FIGS. 4 and 5, each of the passages 30A, 30B and 30C are coextensive and interconnect with each other forming a unitary sensing chamber defining a thin straw sensitive (diaphragm) wall 28. The strain gages are appropriately positioned on the surface 48 of the wall 28. In this regard, refer to FIG. 2 for a clear illustration of the placement of strain gages 51-54. In this regard, the strain gages 51 and 53 are associated with the passageway 30B. The gages 51 and 53 sense tensile strains.

The strain gages 52 and 54 are disposed more adjacent to the passages 30A and 30C, respectively. Refer to FIGS. 4 and 5 in this regard. The strain gages 52 and 54 are for sensing compression strains. Thus, with the sensing structure of the present invention, all four strain gages are active gages.

With respect to the fabrication of the transducer illustrated in FIGS. 1-5, it is noted that each of the end members 24 and 25 have centrally dispose passages therein for accommodating the respective capillary tube 14 and filler tube 15. The capillary tube 14 and filler tube 15 are welded within their respective end members as illustrated at 29 in FIG. 3.

The next step is to provide the filler rods within their accommodating passages in the main body 23. Next, the end members 24 and 25 are welded to the main body 23 as indicated at 33 in FIG. 3.

After the unit has been welded together and heat treated as illustrated by the cross-sectional view of FIG. 3, the strain gages are then affixed in the pattern as illustrated in FIG. 2. FIG. 2 also shows the conductive runs at 55 associated with the strain gages 51-54. In FIG. 3 there is also shown in solid outline, the sensitive (diaphragm) wall 28 for a lower pressure version. Also illustrated in FIG. 3 in phantom outline is a thicker wall 28 which would be used for a higher pressure version. Again, in accordance with the present invention, the expected pressure range for this intermediate pressure transducer is in the range of 500 psi to 7500 psi. There are increments of this pressure range and each increment would be fabricated using a different wall thickness for wall 28.

FIG. 2 also shows, associated with the strain gages 51-54, electrical connection tabs. These include tabs 58 and 59 to the right in FIG. 2 and tabs 60, 61, and 62 to the left in FIG. 2. These connection tabs are connected with the strain gages so as to connect the strain gages in the pattern illustrated in FIG. 5B. In FIG. 5B the same reference characters are employed to identify the same gages as illustrated in FIG. 2. Thus, the circuit interconnection of FIG. 5B illustrates the strain gages 51-54 schematically represented as variable resistances, varying with applied pressure. These resistances are interconnected in a bridge arrangement as illustrated in FIG.

5B having excitation inputs at terminals 64 and 65 and having a signal output at terminals 66 and 67.

An electrical input signal is usually applied across the input terminals 64 and 65 and the pressure responsive voltage is measured across the output terminals 66 and 67. Once again, the compressive gages are gages 52 and 54 while the tensile gages are gages 51 and 53.

In constructing the embodiment of the invention illustrated in FIGS. 2-5, it has been mentioned previously that passages 30A, 30B and 30C are formed in the main body 23. These accommodate the filler rods 31A, 31B and 31C. These filler rods may be constructed of Invar or Kovar or stainless steel so as to provide some temperature compensation for the transducer. This provides temperature compensation in the same manner as the filler piece previously described in connection with FIG. 1A. The formation of the passage 30A, 30B and 30C is in the following manner. Smaller passages are initially drilled with their being no interconnection laterally between these passages. Subsequently, each of the passages is then reamed out so as to provide the finished structure as illustrated in FIG. 5. When the passages are reamed, then these passages are enlarged in diameter and thus become coextensive as illustrated in FIG. 5.

Reference is now made to FIG. 2A. For an illustration of a fragmentary view of an alternate version of the invention relating primarily to the mechanical transducer structure of FIGS. 2-5. In FIG. 2 it is noted that the strain gages 51-54 are disposed in a somewhat staggered array. FIG. 2A instead illustrates the strain gages 51A-54A in a linear array. It is noted that the compression gages 52A and 54A are disposed in a similar position to the gages 52 and 54 such as illustrated in FIG. 5. The tensile gages 51A and 53A are disposed symmetrically on either side of the longitudinal center line of the center passage 30B. In the alternate version of FIG. 2A, the gages 51-54 are interconnected in a bridge circuit in the same manner as depicted in FIGS. 2 and 5B.

Reference is now also made to a further alternate embodiment of FIGS. 2-5. This is illustrated in the fragmentary cross-sectional view of FIG. 5A. FIG. 5A shows the strain gages disposed in a similar manner to that illustrated in FIG. 5. However, in the embodiment of FIG. 5A, rather than employing three separate interconnected passages 30A-30C, there is provided a single elongated passage 30D for accommodating a single filler piece 31D. As wit the filler rods 31A-31C, the filler piece 31D fits with close tolerance in the elongated passage 30D. In the version of FIG. 5A, the length of the passage 30D and the filler piece 31D is the same as the corresponding length of the filler rods and passages illustrated in, for example, FIGS. 2 and 3.

It is furthermore noted in FIG. 5A the elongated shape of the passage and associated filler piece provides a strain sensitive wall 28A that is of a length in FIG. 5A comparable to the length of the sensing wall 28 in FIG. 5.

Reference is now mad to additional embodiments of the invention illustrated in FIGS. 6-16. In these further embodiments of the invention, the same reference characters will be used where appropriate to identify parts of the transducer similar to those previously identified in FIGS. 2-5.

Figures 6, 7, 8, 9:
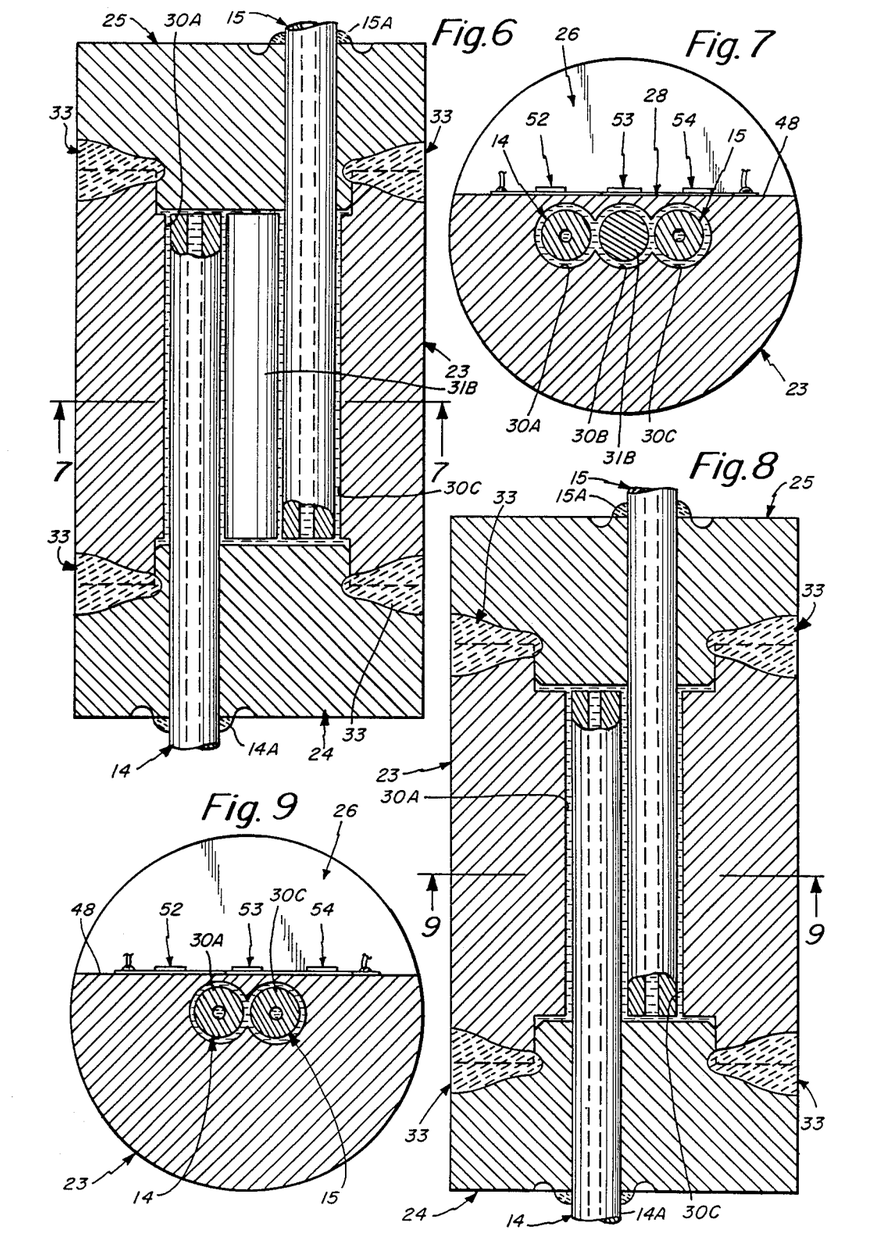
FIG. 6 is a longitudinal cross-sectional view of an alternate embodiment of the sensing member of the invention in which the capillary tubes extend into the sensing chamber.
FIG. 7 is a cross-sectional view taken along line 7—7 of FIG. 6 and showing further details.
FIG. 8 is a longitudinal cross-sectional view of still a further embodiment of the sensing member employing two sensing passages and in which the capillary tubes extend into the sensing chamber.
FIG. 9 is a cross-sectional view taken along line 9—9 of FIG. 8 showing further details.

One further embodiment of the invention is illustrated in FIGS. 6 and 7. This includes a main body 23, with the end members 24 and 25. The end member 24 accommodates the capillary tube 14 and, similarly, the end member 25 accommodates the filler capillary tube 15. It is noted that in this particular embodiment, the capillary tube welded at 14A to the end member 24. Also, the filler capillary tube 15 is welded at 15A to the end member 25. Also illustrated in FIG. 6 are welds 33 for securing the main body and the end members.

In the embodiment of FIGS. 6 and 7, the main body 23 is provided with the recess 26 with the strain gage receiving surface 48. The strain gages are mounted to the surface 48 as in the previous embodiment.

The main body 23 is provided with the same passage arrangement as illustrated in the first embodiment including passages 30A, 30B and 30C that are coextensive with each other.

The primary difference in the embodiment in FIGS. 6 and 7 is that instead of using three filler rods, there is provided only a single filler rod 31B which is used in the center passage 30B. The other passages 30A and 30C are essentially filled by the respective capillary tubes 14 and 15. Note in particular the cross-sectional view of FIG. 6 wherein the capillary tube 14 does not terminate at the end member 24, but instead extends into the chamber formed by the passages and extends into and through the passage 30A. Similarly, the filler capillary tube 15 does not terminate at the end member 25, but instead extends into the passage 30C. Thus, in this particular embodiment, the ends of the respective capillary tubes actually form a filler means. The ends of the capillary tube communicate with the respective passages and thus the liquid fill, preferably mercury, fills the entire passage structure.

Reference is now made to FIGS. 8 and 9 for still a further embodiment of the present invention. In this embodiment, the transducer comprises a main body 23 with end members 24 and 25. The capillary tubes 14 and 15 are secured in the end members 24 and 25, respectively. The end members are welded to the main body as indicated at 33. The capillary tube 14 is welded at 14A and the capillary tube 15 is welded at 15A.

As in the embodiment of FIGS. 6 and 7, in the embodiment of FIGS. 8 and 9, the capillary tubes 14 and 15 extend into the respective passages 30A and 30C. It is noted in this embodiment that only two passages are provided. The two passage version does not provide as low a pressure range. In the embodiments of FIGS. 8 and 9 as well as the embodiments of FIGS. 6 and 7, the transducer is constructed by securing the capillary tubes in the end members first. The filler rod is inserted in the embodiment of FIG. 6 and because no filler rod is used, there is none inserted in the embodiment of FIG. 8. The capillary tubes are then guided into the appropriate passages and the end members are welded with the main body.

In the different embodiments herein, it is noted that either a single passage may be provided as illustrated in FIG. 5A with an associated filler piece or multiple passages may be employed. FIG. 6 shows the use of three passages while FIG. 8 shows the use of two passages. Versions of the invention can also be constructed in which there are additional sensing passages provided. For example, five passages may be provided. Odd multiples of passages are preferred for symmetry reasons.

Figures 10, 11, 12, 13:
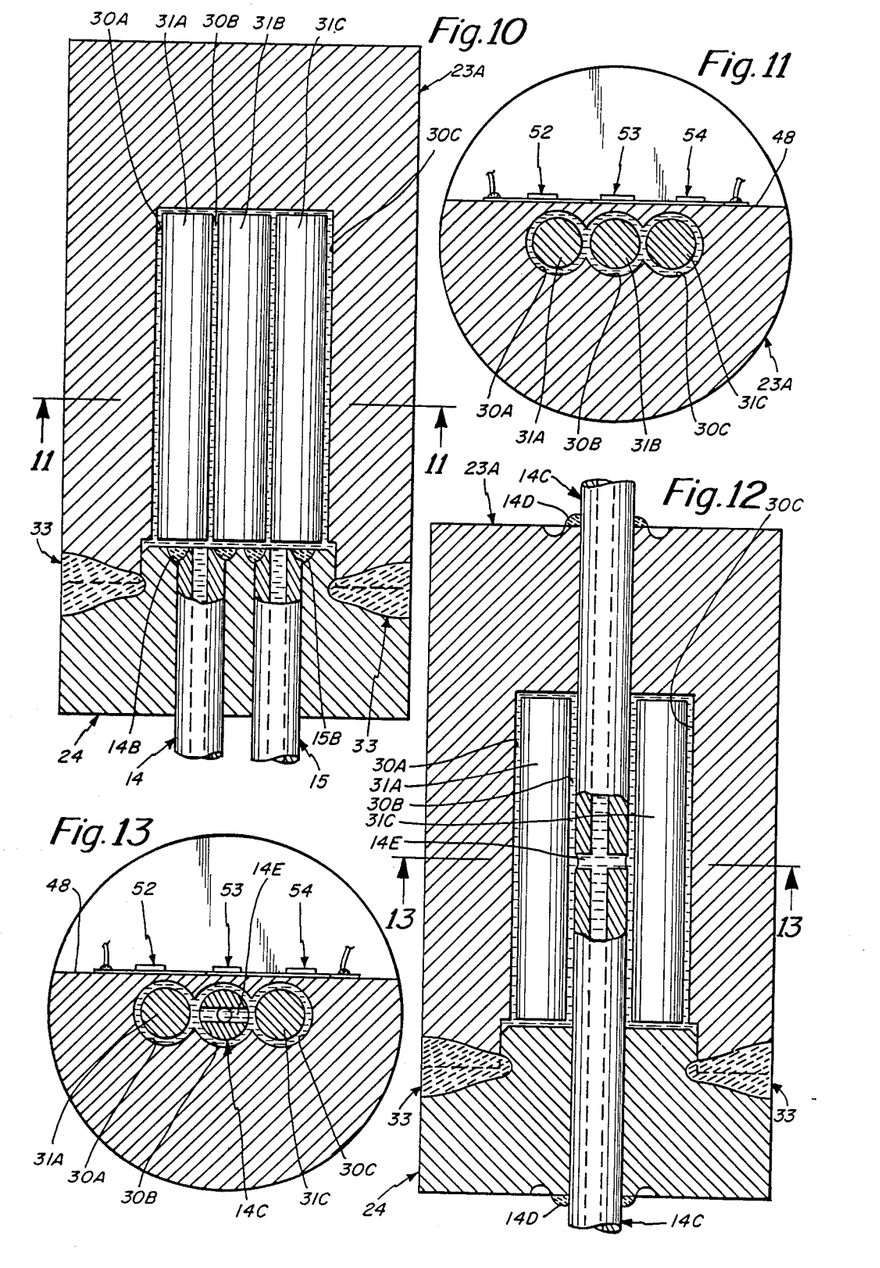
FIG. 10 is a longitudinal cross-sectional view of still another embodiment of the sensing member of this invention in which the capillary tube and filler tube both extend from the same side of the sensing chamber and in which the filler rods are disposed in blind ends of the sensing member.
FIG. 11 is a cross-sectional view taken along line 11—11 of FIG. 10 and showing further details.
FIG. 12 is a longitudinal cross-sectional view of a further embodiment of the sensing member of the present invention in which the capillary tube extends through the sensing chamber.
FIG. 13 is a cross-sectional view taken along line 13—13 of FIG. 12.

Still a further embodiment of the invention is illustrated in FIGS. 10 and 11. This embodiment of the invention also employs a main body 23A, but is not provided with two end members. Instead, there is a single end member 24. In this embodiment, the end member 24 accommodates both the capillary tube and the filler tube 15. These tubes are welded to the end member 24. FIG. 10 illustrates the weld 14B for securing the capillary tube 14 and the weld 15B for securing the filler capillary tube 15. The end member 24 is secured to the main body 23A by the weld 33.

In this embodiment of the invention, there are also provided the three passages 30A, 30B and 30C. These passages accommodate the filler rods 31A, 31B and 31C, respectively. The embodiment of FIGS. 10 and 11 differs from the previous embodiments in that the filler rods are disposed in these passages and the passages are blind ended. Both the capillary tube and the filler tube extend from the same side of the sensing member. As with the previous embodiments, the device is constructed by securing the capillary tube and the filler tube to the end member 24 first. Them, the filler rods are disposed in the appropriate passages in the main body 23A and the end member 24 is welded to the main body 23A at 33.

Reference is now made to a further embodiment illustrated in FIG. 12 and 13. This embodiment to the invention also employs the three passage construction, including the passages 30A, 30B and 30C. These are the passages that are provided in the main body 23A. Again, in this version as in the embodiment of FIG. 10, there is only a single end member 24 employed.

The main difference between the embodiment of FIG. 12 in comparison to the previous embodiments is that there is provided only a capillary tube 14 and no filler tube 15. The top end of the capillary tube 14C in FIG. 12 may couple in a similar manner to some type of a fill plug. In this embodiment of the invention, it is noted that the capillary tube 14C extends through the entire sensing member. The capillary tube 14C extends through the passage 30B in the main body 23A. It is noted that the capillary tube 14C is secured to the end member 24 and the main body 23A by wells as indicated at 14D in FIG. 12. Also, the capillary tube 14C is provided with a transverse hole 14E to permit fluid communication from the capillary tube 14C to the sensing chamber comprised of passages 3AA, 30B and 30C. Thus, in the embodiment of FIGS. 12 and 13, the capillary tube itself actually forms a filler means for the intermediate passage and provides fluid communication by means of the transverse hole 14E. This is clearly illustrated in the cross-sectional view of FIG. 12.

In the construction of the embodiment of FIGS. 12 and 13, the capillary tube may be first secured to the end member 24 at the lower weld 14D. Then, the end member with the capillary tube 14C attached thereto is inserted into the main body 23A. The second weld 14D can then be provided as well as the circumferential weld 33 between the main body 23A and the end member 24.

Figures 14, 15, 16:
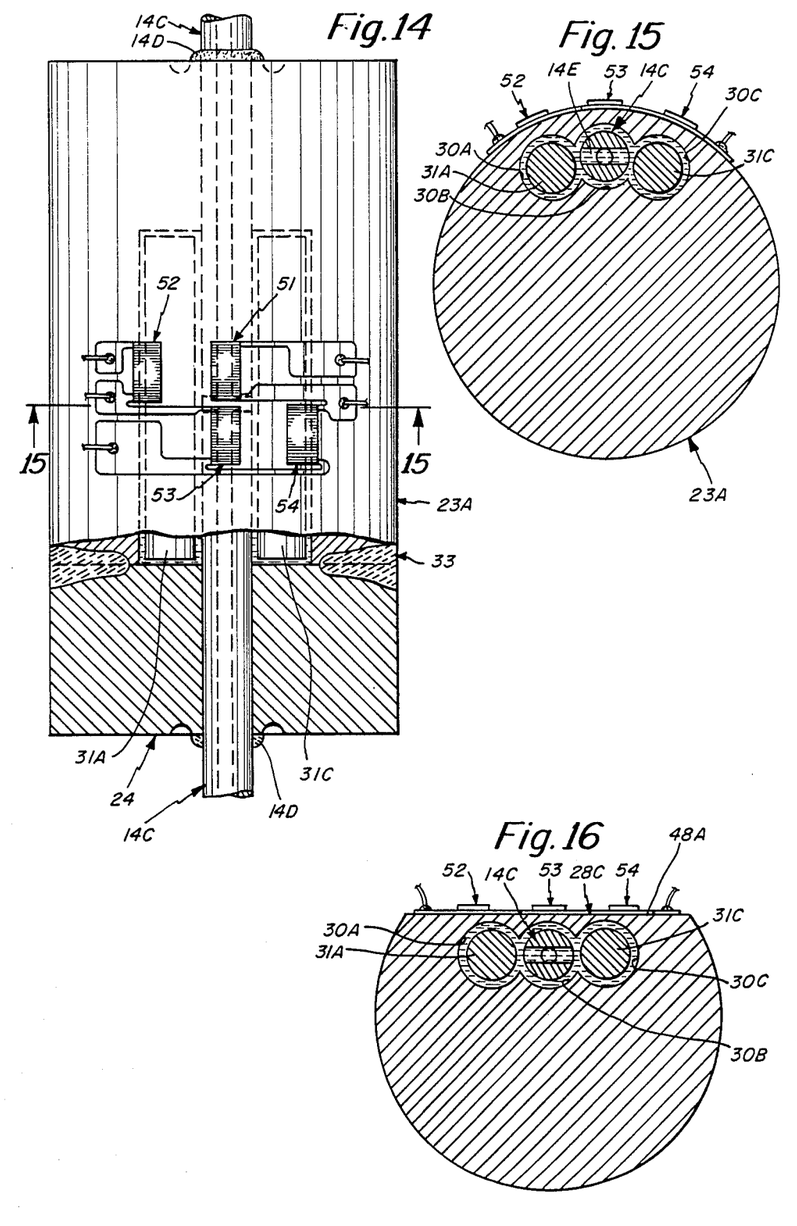

Reference is now made to a further embodiment of the invention illustrated in FIGS. 14 and 15. This is an embodiment of the invention in which there is no recess provided in the sensing member. Instead, the sensing chamber formed by the three passages is disposed close to the outer circumference of the main body. It is furthermore noted that in the particular embodiment of FIGS. 14 and 15, there is described the version in which the capillary tube 14C extends through the sensing member from top to bottom. The embodiment of the invention that without the recess may also be used in the earlier embodiments described herein.

Thus, in FIGS. 14 and 15, there is illustrated the main body 23A with the end member 24 secured thereto at the weld 33. Note that in this embodiment there is no recess provided in the main body 23A. In this embodiment of the invention, the strain gages 51-54 are secured directly to the outer circumferential surface of the main body 23A. The passages 30A, 30B and 30C are thus disposed, not near the center of the main body, but instead close to the periphery thereof as illustrated in FIG. 15.

In the embodiment of FIGS. 14 and 15, it is noted that the capillary tube 14C extends through the sensing member and is provided with the transverse passage 14E. The capillary tube 14C is also welded to both the end member 24 as well as the main body 23A. Note the welds at 14D in FIG. 14. The transducer illustrated in FIGS. 14 and 15 is assembled in the same manner as previously described in connection with the embodiment of FIGS. 12 an 13.

Reference is now also made to a further embodiment of the invention illustrated only in FIG. 16. This embodiment may be substantially identical to the embodiment of FIGS. 14 and 15, but instead of having the strain gages 51-54 disposed on the outer circumference, a flat surface 48A is provided. The gages are then disposed directly on the flat surface 48A. In the embodiment of FIG. 16, it is noted that a recess is still not provided and the sensing diaphragm surface at 28C is provided by using the flat surface 48A in association with the coextensive passages 30A-30C arranged in horizontal alignment. It is noted that in the embodiment of FIGS. 14 and 15, the passages are disposed along a circumferential locus rather than a linear in line direction as in FIG. 16.

Having now described a limited number of embodiments of the present invention, it should now be apparent to those skilled in the art that numerous other embodiments and modifications thereof are contemplated as falling within the scope of the present invention. For example, there has been described herein in FIG. 5A a single passage version employing a sensing passage that is oval shaped or elongated with curved ends. In an alternate embodiment of the invention, this passage may also be of square or rectangular cross-section or could alternatively be of other shape such as even triangular shape in cross-section.

What is claimed is:
1. A pressure transducer comprising;
    an elongated frame having an elongated passage therethrough,
    a capillary tube extending through the frame passage and terminating at one end adjacent one end of the frame,
    a coupler at said one end of the frame and defining with the frame a chamber in communication with the capillary tube,
    a sensing member disposed at the other end of the frame and having a passage therein for receiving the capillary tube,
    said sensing member having a sensing chamber formed therein defining a relatively thin wall forming a sensing surface adjacent said sensing chamber,
    a filler means disposed in said sensing chamber,
    and means for sensing pressure at said wall.
2. A pressure transducer as set forth in claim 1 wherein said sensing surface is defined by a recess in the sensing member and said capillary tube has a passage therethrough extending substantially transverse to the axis thereof and for permitting fluid communication between the capillary tube and said sensing chamber.

3. A pressure transducer as set forth in claim 2 wherein said relatively thin wall has a pressure responsive sensing surface and said means for sensing comprises at least one sensing gage disposed on said sensing surface.

4. A pressure transducer as set forth in claim 3 wherein said pressure responsive sensing surface extends substantially parallel to the capillary tube length.

5. A pressure transducer as set forth in claim 4 wherein said pressure responsive sensing surface is substantially flat.

6. A pressure transducer as set forth in claim 5 wherein the sensing member is substantially cylindrical and said recess forms a flat surface closely adjacent the capillary tube.

7. A pressure transducer as set forth in claim 1 wherein said sensing chamber is at least partially cylindrical.

8. A pressure transducer as set forth in claim 7 wherein the capillary tube extends through the sensing chamber and has a transverse hole at approximately a midpoint distance of the recess in the sensing member.

9. A pressure transducer as set forth in claim 1 wherein said capillary tube is secured at top and bottom ends of the sensing member.

10. A pressure transducer as set forth in claim 9 wherein the securing of the capillary tube is by welding.

11. A pressure transducer as set forth in claim 1 wherein said means for sensing comprises a pair of strain gages disposed on a pressure responsive sensing surface of said thin wall.

12. A pressure transducer as set forth in claim 11 wherein there are also included a second pair of strain gages, said first pair of strain gages measuring compressive strains and the second pair of strain gages measuring tensile strains.

13. A pressure transducer as set forth in claim 1 including a filler piece in the coupler chamber and forming at least a side of the coupler chamber,
said filler piece having a coefficient of expansion substantially less than that of the frame.

14. A pressure transducer as set forth in claim 13 wherein said filler piece has a coefficient of expansion substantially less than that of the frame.

15. A pressure transducer as set forth in claim 1 in which said sensing member is adaptive for operation over a pressure range of 500-7500 psi.

16. A pressure transducer as set forth in claim 1 wherein said sensing chamber is comprised of multiple passages and said filler means comprises separate multiple filler rod means.

17. A pressure transducer as set forth in claim 16 further including a filler tube and wherein said sensing member comprises a main body and separate end members for receiving said respective capillary tube and filler tube.

18. A pressure transducer as set forth in claim 17 wherein at least said capillary tube extends into said sensing chamber.

19. A pressure transducer as set forth in claim 18 wherein both said capillary tube and filler tube extend into said sensing chamber.

20. A pressure transducer as set forth in claim 19 wherein there is provided a three passage chamber with the filler rod means disposed in the sensing chamber middle passage between the extended capillary tube and filler tube.

21. A pressure transducer comprising;
an elongated frame having an elongated passage therethrough,
a capillary tube extending through the frame passage and terminating at one end adjacent one end of the frame,
a coupler at said one end of the frame and defining with the frame a chamber in communication with the capillary tube,
a sensing member at the other end of the frame and including means defining an internal passage forming at least part of a sensing chamber in fluid communication with the capillary tube, and means defining a sensing surface on the sensing member formed by a relatively thin wall adjacent said sensing chamber,
a substantially incompressible liquid filling the capillary tube, coupler chamber and sensing chamber,
gauge means disposed on said sensing surface for sensing pressure at said thin wall,
and means for securing the capillary tube to the sensing member to provide a liquid tight retention between the sensing member and capillary tube whereby the incompressible liquid is coupled via the capillary tube directly to the sensing chamber,
said capillary tube having a segment thereof extending into said sensing chamber passage to at least partially fill said passage while maintaining fluid communication between the sensing chamber passage and capillary tube.

22. A pressure transducer as set forth in claim 21 wherein said capillary tube is open ended to provide said fluid communication.

23. A pressure transducer comprising;
an elongated frame having an elongated passage therethrough,
a capillary tube extending through the frame passage and terminating at one end adjacent one end of the frame,
a coupler at said one end of the frame and defining with the frame a chamber in communication with the capillary tube,
a sensing member at the other end of the frame and including means defining a sensing chamber in fluid communication with the capillary tube, and means defining a sensing surface on the sensing member forming a relatively thin wall adjacent said sensing chamber,
a substantially incompressible liquid filling the capillary tube, coupler chamber and sensing chamber,
gauge means disposed on said sensing surface for sensing pressure at said thin wall,
and means for securing the capillary tube to the sensing member to provide a liquid tight retention between the sensing member and capillary tube whereby the incompressible liquid is coupled via the capillary tube directly to the sensing chamber,
said sensing chamber having a passage for receiving said capillary tube therein while maintaining fluid communication between the sensing chamber passage and capillary tube,
and a filler tube also extending into the passage of the sensing chamber, said capillary tube and filler tube being disposed in side-by-side parallel position.

24. A pressure transducer comprising;
an elongated frame having an elongated passage therethrough, a capillary tube extending through the frame passage and terminating at one end adjacent one end of the frame, a coupler at said one end of the frame and defining with the frame a chamber in communication with the capillary tube, a sensing member at the other end of the frame and including means defining a sensing chamber in fluid communication with the capillary tube, and means defining a sensing surface on the sensing member forming a relatively thin wall adjacent said sensing chamber, a substantially incompressible liquid filling the capillary tube, coupler chamber and sensing chamber, gauge means disposed on said sensing surface for sensing pressure at said thin wall, and means for securing the capillary tube to the sensing member to provide a liquid tight retention between the sensing member and capillary tube whereby the incompressible liquid is coupled via the capillary tube directly to the sensing chamber, said sensing chamber having a passage for receiving said capillary tube therein while maintaining fluid communication between the sensing chamber passage and capillary tube, and a filler piece in the coupler chamber.

25. A pressure transducer as set forth in claim 21 wherein the sensing chamber disposed adjacent said thin wall is formed between said capillary tube segment and said wall.

26. A pressure transducer comprising;

an elongated frame having elongated passage therethrough, a capillary tube extending through the frame passage and terminating at one end adjacent one end of the frame, a coupler at said one end of the frame and defining with the frame a chamber in communication with the capillary tube, a sensing member at the other end of the frame and including means defining a sensing chamber in fluid communication with the capillary tube, and means defining a sensing surface on the sensing member forming a relatively thin wall adjacent said sensing chamber, a substantially incompressible liquid filling the capillary tube, coupler chamber and sensing chamber, gauge means disposed on said sensing surface for sensing pressure at said thin wall, and means for securing the capillary tube to the sensing member to provide a liquid tight retention between the sensing member and capillary tube whereby the incompressible liquid is coupled via the capillary tube directly to the sensing chamber, said sensing chamber having a passage for receiving said capillary tube therein while maintaining fluid communication between the sensing chamber passage and capillary tube, said sensing member having a passage therein for receiving a filler means.

27. A pressure transducer as set forth in claim 26 wherein said sensing chamber has multiple passages for receiving corresponding multiple filler rods.

28. A pressure transducer comprising;

an elongated frame having an elongated passage therethrough, a capillary tube extending through the frame passage and terminating at one end adjacent one end of the frame, a coupler at said one end of the frame and defining with the frame a chamber in communication with the capillary tube, a sensing member at the other end of the frame and including means defining a sensing chamber in fluid communication with the capillary tube, and means defining a sensing surface on the sensing member forming a relatively thin wall adjacent said sensing chamber, a substantially incompressible liquid filling the capillary tube, coupler chamber and sensing chamber;

gauge means disposed on said sensing surface for sensing pressure at said thin wall, and means for securing the capillary tube to the sensing member to provide a liquid tight retention between the sensing member and capillary tube whereby the incompressible liquid is coupled via the capillary tube directly to the sensing chamber, said sensing chamber having a passage for receiving said capillary tube therein while maintaining fluid communication between the sensing chamber passage and capillary tube, and means defining a passage extending transverse to the axis of the capillary tube and for coupling fluid between the capillary tube and sensing chamber, said transverse passage having a length comparable to capillary tube diameter.

29. A pressure transducer as set forth in claim 28 including at least one filler rod means also disposed in said sensing chamber adjacent said capillary tube.

30. In a liquid-filled pressure transducer having a frame, a capillary tube extending through the frame and a sensing element having a bore for receiving the capillary tube, a method of securing the sensing element to the capillary tube in a liquid tight manner, said method comprising the steps of, providing a main body of the sensing element with at least one passage therein, providing at least one end member, welding the capillary tube to the end member, providing a filler means, disposing the filler means in the passage in the main body, and welding the main body and end member together to provide a liquid tight joint.

31. In a liquid-filled pressure transducer as set forth in claim 30 including the further step of providing a second end member and associated filler tube, welding the filler tube to the second end member and then welding the second end member to the opposite end of the main body.

32. In a liquid-filled pressure transducer as set forth in claim 30 including the further step of permitting said capillary tube to extend into said sensing member passage.

33. In a liquid-filled pressure transducer as set forth in claim 30 including the further step of providing a filler tube also secured in said at least one end member.

34. In a liquid-filled pressure transducer having a frame, a capillary tube extending through the frame and a sensing element having a bore for receiving the capillary tube, a method of securing the sensing element to the capillary tube in a liquid tight manner, said method comprising the steps of, providing a main body of the sensing element with at least one passage therein, providing at least one end member, securing the capillary tube to the end member, while permitting a segment of the capillary tube to extend into said main body passage, and securing the main body and end member together to provide a liquid tight joint.

35. In a liquid-filled pressure transducer as set forth in claim 34 including the further step of providing a second end member and associated filler tube, securing the filler tube to the second end member, and then securing the second end member to the opposite end of the main body.

36. In a liquid-filled pressure transducer as set forth in claim 35 including the further step of providing a filler means and disposing the filler means in the main body.

37. A pressure transducer comprising;
an elongated frame having an elongated passage therethrough,
a capillary tube extending through the frame passage and terminating at one end adjacent one end of the frame,
a coupler at said one end of the frame and defining with the frame a chamber in communication with the capillary tube,
a sensing member disposed at the other end of the frame and having a passage therein for receiving the capillary tube,
said sensing member having a sensing chamber formed therein defining a relatively thin wall forming a sensing surface adjacent said sensing chamber,
a liquid filling at least the capillary tube and sensing chamber,
a filler means disposed in said sensing chamber,
said filler means comprised of a segment of said capillary tube.

38. A pressure transducer as set forth in claim 37 wherein said filler means includes a filler member disposed in said sensing chamber adjacent said capillary tube segment.

39. A pressure transducer as set forth in claim 37 wherein said capillary tube and segment thereof are contiguous.

40. A pressure transducer comprising;
an elongated frame having an elongated passage therethrough,
a capillary tube extending through the frame passage and terminating at one end adjacent one end of the frame,
a coupler at said one end of the frame and defining with the frame a chamber in communication with the capillary tube,
a sensing member disposed at the other end of the frame and having a passage therein for receiving the capillary tube,
said sensing member having a sensing chamber formed therein defining a relatively thin wall forming a sensing surface adjacent said sensing chamber,
a liquid filling at least the capillary tube and sensing chamber,
said capillary tube having a segment thereof extending into said sensing chamber to at least partially fill said sensing chamber and to define a liquid-filled sensing area formed between said capillary tube segment and said thin wall.

41. A pressure transducer as set forth in claim 40 further including a filler member disposed in said sensing chamber adjacent said capillary tube segment.

* * * * *